(12) United States Patent
Shigeta et al.

(10) Patent No.: US 6,704,446 B2
(45) Date of Patent: Mar. 9, 2004

(54) LUMINANCE GRADATION CORRECTING APPARATUS FOR A VIDEO SIGNAL

(75) Inventors: Tetsuya Shigeta, Yamanashi (JP); Tetsuro Nagakubo, Yamanashi (JP); Hirofumi Honda, Yamanashi (JP)

(73) Assignee: Pioneer Corporation, Tokyo (JP)

( * ) Notice: Subject to any disclaimer, the term of this patent is extended or adjusted under 35 U.S.C. 154(b) by 538 days.

(21) Appl. No.: 09/808,106

(22) Filed: Mar. 15, 2001

(65) Prior Publication Data
US 2001/0036312 A1 Nov. 1, 2001

(30) Foreign Application Priority Data
Mar. 16, 2000 (JP) ........................................ 2000-073845

(51) Int. Cl.$^7$ ................................................ G06K 9/00
(52) U.S. Cl. ........................ 382/168; 382/169; 358/521; 358/522
(58) Field of Search ................................ 382/162, 167, 382/168, 169, 172, 274; 358/521, 522, 518, 538; 348/672

(56) References Cited

U.S. PATENT DOCUMENTS 4,731,662 A * 3/1988 Udagawa et al. ........... 358/520
5,388,168 A * 2/1995 Sakashita et al. ........... 382/169
5,777,759 A * 7/1998 Kaburagi et al. .......... 358/3.01
6,154,288 A * 11/2000 Watanabe ................... 358/521

* cited by examiner

Primary Examiner—Phuoc Tran
(74) Attorney, Agent, or Firm—Sughrue Mion, PLLC (57) ABSTRACT

A luminance gradation correcting apparatus which can properly correct the gradation of a luminance level even if a size of actual image portion of an image differs from a size of image. The apparatus has: a masking part for allowing only a luminance signal of a pixel in a predetermined detecting range in the vertical direction in an image shown by an input luminance signal to pass; a histogram memory for forming frequency data at each luminance level of the luminance signal outputted from the masking part at every predetermined period and storing it; a correcting part for correcting the luminance level of the input luminance signal based on the frequency data in the histogram memory; and a detecting range setting part for obtaining an accumulation value of the frequency data with respect to the luminance signal in a portion of the luminance level in a range from the zero level to the non-image display color level in the input luminance signal and setting the predetermined detecting range based on the accumulation value.

9 Claims, 13 Drawing Sheets

LUMINANCE GRADATION CORRECTING APPARATUS FOR A VIDEO SIGNAL

BACKGROUND OF THE INVENTION

1. Field of the Invention

The invention relates to a luminance gradation correcting apparatus for correcting a luminance gradation of a video signal.

2. Description of Related Art

In recent years, in association with the increase in size of display apparatuses, there is an increasing need to have a luminance gradation correcting apparatus in order to allow images to be seen more clearly. In a luminance gradation correcting apparatus, usually, a luminance gradation of the video signal is corrected by supplying a video signal to a non-linear amplifier, so as to widen a luminance distribution to a whole extent of the dynamic range.

Figure 1:
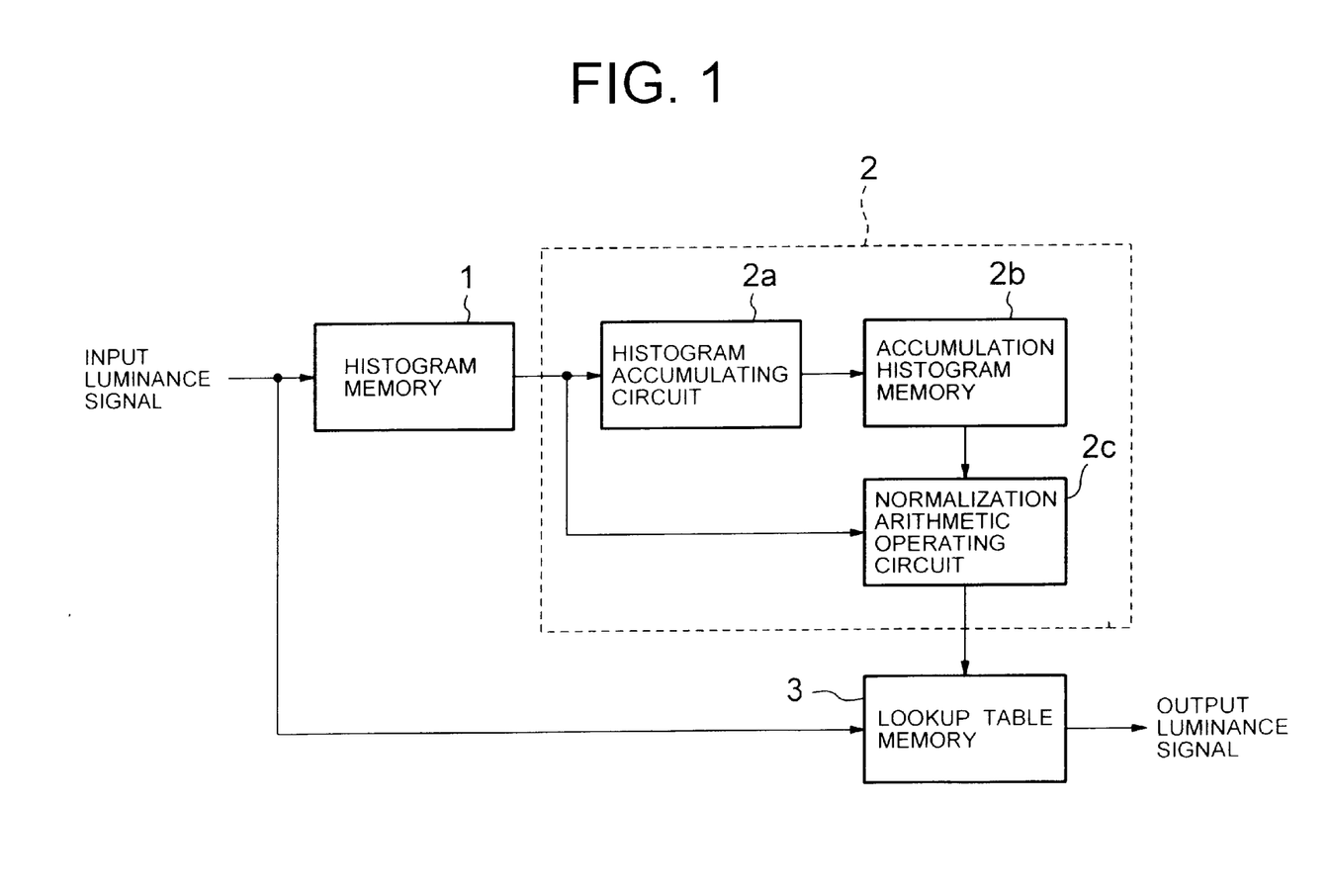
FIG. 1 is a block diagram showing a conventional luminance gradation correcting apparatus.

FIG. 1 shows a conventional luminance gradation correcting apparatus. The luminance gradation correcting apparatus comprises a histogram memory 1, a maximum correction value calculating circuit 2, and a lookup table memory 3. A digital luminance signal is supplied as an input signal to the histogram memory 1 and lookup table memory 3. The histogram memory 1 is a memory for obtaining a luminance distribution of the input luminance signal and has a memory area whose address is designated by each of a plurality of predetermined luminance levels. A frequency is stored in each memory area. That is, each time the luminance signal of one pixel is supplied, the frequency in the memory area of the histogram memory 1 corresponding to the luminance level is increased by 1. All storage contents in the histogram memory 1 are cleared to 0 every predetermined period (one vertical scan period or a period which is an integer multiple of one vertical scan period), so that a new luminance distribution is obtained.

The maximum correction value calculating circuit 2 comprises: a histogram accumulating circuit 2a for sequentially accumulating data in the histogram memory 1 from the data of a low luminance; an accumulation histogram memory 2b for storing a result of the accumulating circuit 2a; and a normalization arithmetic operating circuit 2c for normalizing each data so that the maximum accumulation degree equals the maximum value of an output luminance signal based on the data stored in the accumulation histogram memory 2b. The accumulation histogram memory 2b has a memory area of a frequency which is address designated by each of the luminance levels of the luminance signal in a manner similar to the histogram memory 1.

The lookup table memory 3 stores data obtained by normalizing the storage data in the accumulation histogram memory. An address in the lookup table memory 3 is designated according to the luminance level of the input luminance signal and the luminance level stored in the memory area of the designated address is outputted as a normalized level.

Figure 2A:
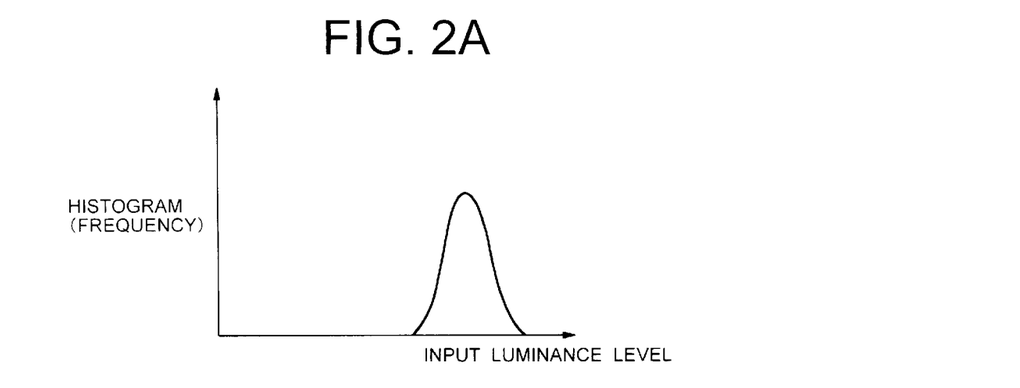
FIGS. 2A to 2C are characteristics graphs for explaining an example of the operation of the apparatus of FIG. 1.
Figure 2B:
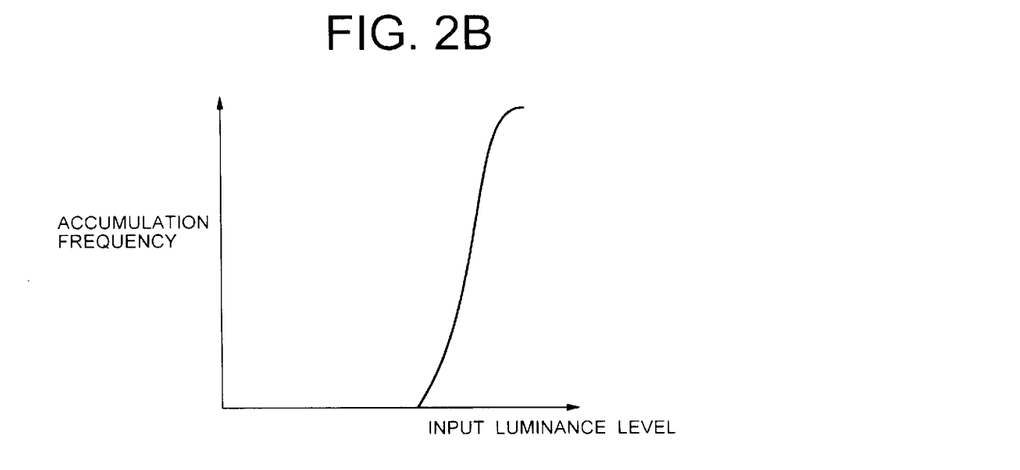
Figure 2C:
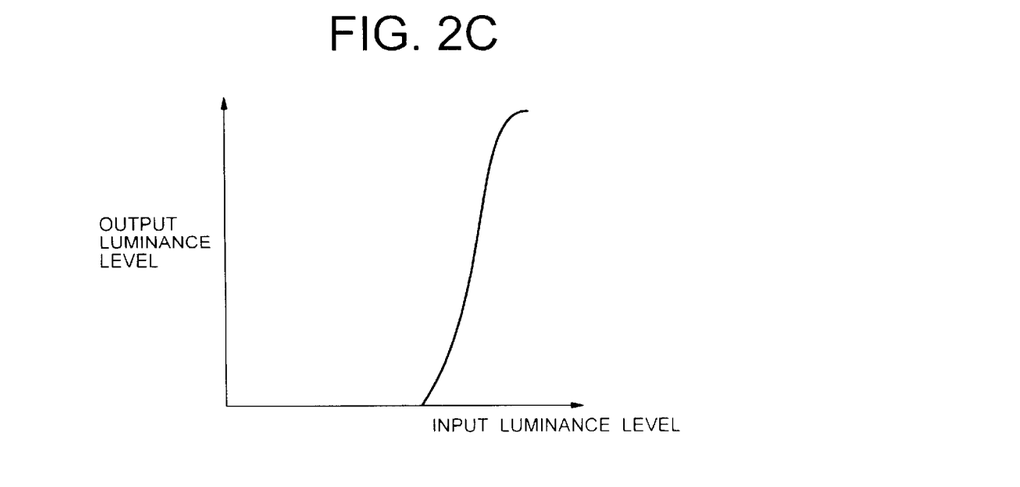

FIGS. 2A to 2C show the luminance converting operation by the conventional luminance gradation correcting apparatus by way of waveforms. One of the addresses in the histogram memory 1 is designated every pixel of the input luminance signal. The value in the memory area of the designated address is increased by 1. It is assumed that the frequency corresponding to the luminance level of the input luminance signal for a predetermined period is detected as shown in FIG. 2A. For the better understanding of the conversion operation, it is assumed that frequencies at luminance levels $Y_{150}$, $Y_{160}$, $Y_{170}$, $Y_{180}$, $Y_{190}$, $Y_{200}$, and $Y_{210}$ were detected in the histogram memory 1. There are relations of $Y_{150} < Y_{160} < Y_{170} < Y_{180} < Y_{190} < Y_{200} <$ and $Y_{210}$. Assuming that the frequencies in the predetermined period are equal to 1, 3, 5, 7, 5, 3, and 1 for the luminance levels $Y_{150}$, $Y_{160}$, $Y_{170}$, $Y_{180}$, $Y_{190}$, $Y_{200}$, and $Y_{210}$, the accumulation frequencies are equal to 1, 4, 9, 16, 21, 24, and 25 for the luminance levels $Y_{150}$, $Y_{160}$, $Y_{170}$, $Y_{180}$, $Y_{190}$, $Y_{200}$, and $Y_{210}$. That is, as shown in FIG. 2B, as the luminance level increases, the accumulation frequency increases. A normalization coefficient is calculated by the normalization arithmetic operating circuit 2c so that the maximum value of the accumulation frequency equals the maximum value of the output luminance level. The normalization coefficient is multiplied to each data in the histogram memory 1 and a multiplication result is stored into the corresponding memory area in the lookup table memory 3. A relation between the input luminance level and the output luminance level of the lookup table memory 3 is as shown in FIG. 2C. By transmitting the input luminance signal through the lookup table memory 3, the luminance signal is outputted whose gradation has been corrected.

Figure 3:
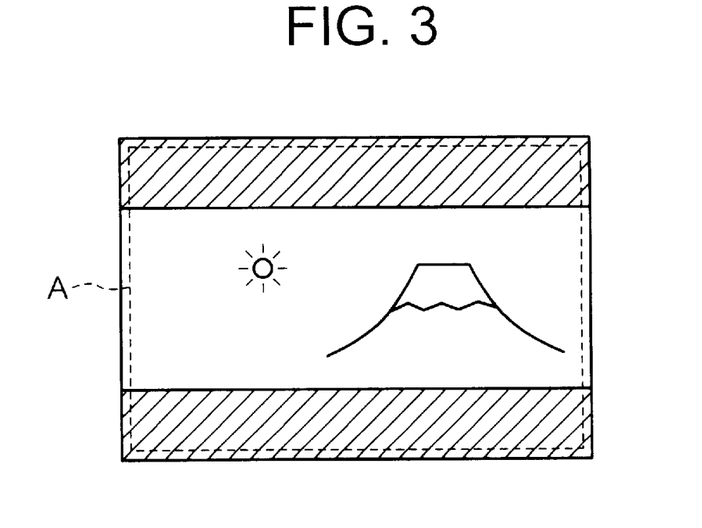
FIG. 3 is a diagram showing a display example of an image in which an actual image portion is narrow in the vertical direction.
Figure 4:
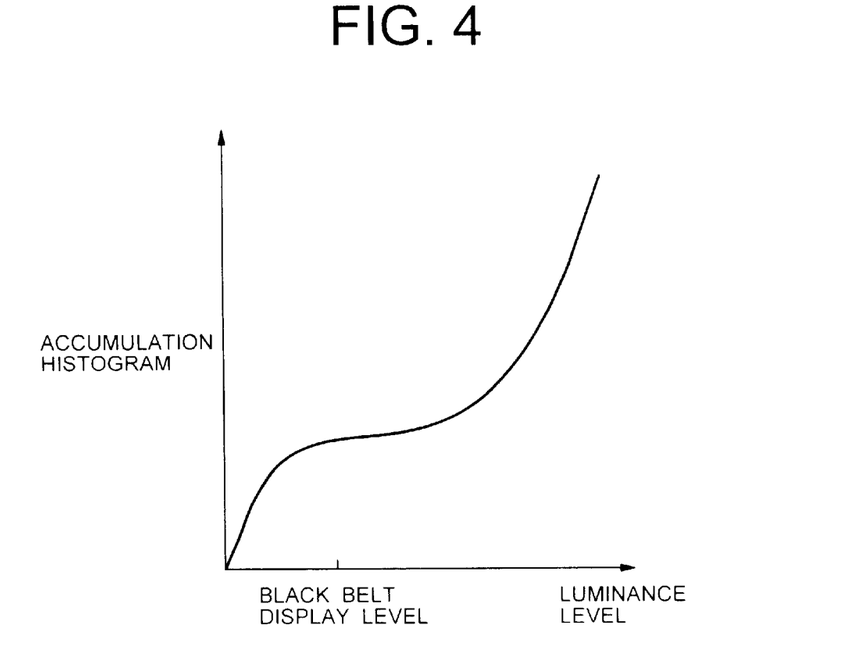
FIG. 4 is a graph showing an accumulation histogram of a luminance level of the image in FIG. 3.

However, as the image carried by a supplied video signal there is a cinesco size image or the like in which an actual image portion is narrow in the vertical direction. In the case of the conventional luminance gradation correcting apparatus, non-image portions (black belts) appear in the upper and lower portions as shown by hatched regions in FIG. 3 in the image mentioned above. If a detecting area of an accumulation histogram is an area surrounded by a dotted line A in FIG. 3 including the non-image portions, therefore, the accumulation histogram has such a characteristic as shown in FIG. 4. That is, the accumulation histogram has a problem that the frequency of the black level in the non-image portion is largely influenced by the frequency of the luminance level in the actual image portion and, if the gradation of the luminance level is corrected based on the accumulation histogram. Thus, there has been a problem of a black floating or the like in which a black level rises in the actual image portion.

OBJECTS AND SUMMARY OF THE INVENTION

It is, therefore, an object of the invention to provide a luminance gradation correcting apparatus which can properly correct a gradation of a luminance level even if a size of actual image portion of an image differs from a size of image shown by a video signal.

According to the invention, there is provided a luminance gradation correcting apparatus comprising: a masking part for allowing only a luminance signal of a pixel in a predetermined detecting range in the vertical direction in an image shown by an input luminance signal to pass; a histogram memory for forming frequency data at each luminance level of the luminance signal outputted from the masking part for every predetermined period and storing it; a correcting part for correcting the luminance level of the input luminance signal based on the frequency data in the histogram memory; and a detecting range setting part for obtaining an accumulation value of the frequency data regarding the luminance signal in which the luminance level lies within a range from a zero level to a non-image display color level in the input luminance signal and setting the predetermined detecting range based on the accumulation value.

According to the luminance gradation correcting apparatus of the invention, since the predetermined detecting range in the vertical direction in the image shown by the input luminance signal is set in accordance with the size of actual image portion of the image, the gradation of the luminance level of the input luminance signal can be properly corrected without being influenced by the luminance level of the non-image portions.

DETAILED DESCRIPTION OF THE PREFERRED EMBODIMENTS

An embodiment of the invention will be described in detail hereinbelow with reference to the drawings.

Figure 5:
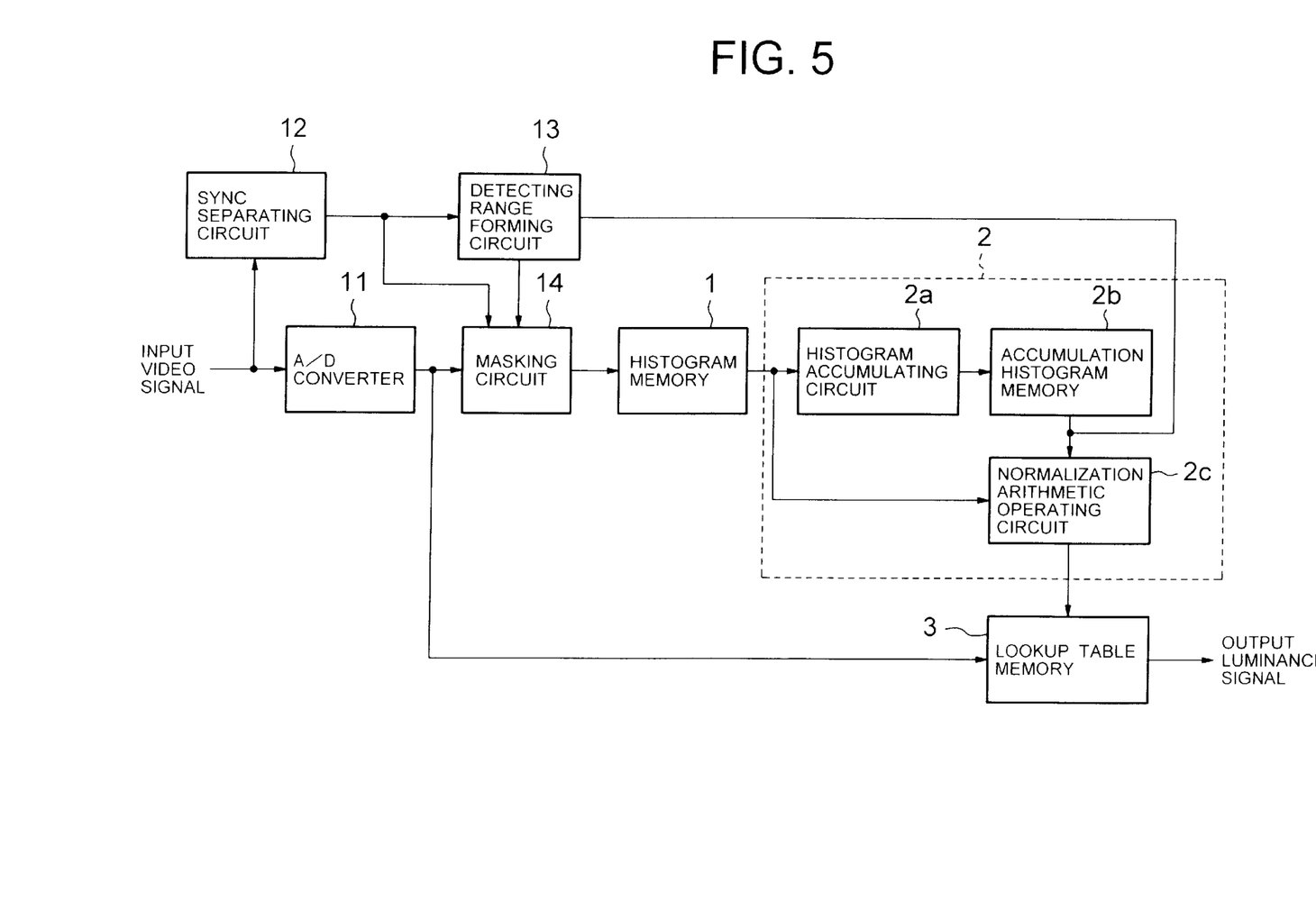
FIG. 5 is a block diagram showing an embodiment of the invention.

FIG. 5 shows a luminance gradation correcting apparatus according to the invention. As shown in FIG. 5, the luminance gradation correcting apparatus comprises an A/D converter 11, a sync separating circuit 12, a detecting range forming circuit 13, and a masking circuit 14 in addition to the conventional construction (histogram memory 1, maximum correction value calculating circuit 2, and lookup table memory 3) shown in FIG. 1. The A/D converter 11 converts an input video signal (composite signal) into a digital signal. The sync separating circuit 12 extracts a vertical sync signal and a horizontal sync signal of the input video signal and supplies them to the detecting range forming circuit 13 and masking circuit 14.

The detecting range forming circuit 13 detects an image size of the input video signal in accordance with the contents in the accumulation histogram memory 2b in the maximum correction value calculating circuit 2 and sets a detecting range of the video signal. The masking circuit 14 is connected to an output of each of the A/D converter 11 and detecting range forming circuit 13 and supplies a digital video signal in the detecting range set by the detecting range forming circuit 13 to the histogram memory 1.

Since the histogram memory 1, maximum correction value calculating circuit 2, and lookup table memory 3 are the same as those shown in FIG. 1, their detailed description is omitted here.

Although not shown, in the case where the input video signal is a color video signal, for example, a Y-C separating circuit 11 is provided at the post stage of the A/D converter and a separated luminance signal is supplied to the masking circuit 14.

As a size of actual image portion of the input video signal, it is assumed that there are a size of image of 4:3, vista size, and cinesco size.

In the case where the input video signal is a signal of the 4:3 image, its actual image is formed by 199 scanning lines in a range of the 39th to 237th lines. In the case where the input video signal is a signal of the image of the vista size, its actual image is formed by 167 scanning lines in a range of the 56th to 222th lines. In the case where the input video signal is a signal of the image of the cinesco size, its actual image is formed by 139 scanning lines in a range of the 70th to 208th lines.

In the embodiment, the actual image portion of the vista size is set to the detecting range for the 4:3 image and the vista size image, and the actual image portion of the cinesco size is set to the detecting range for the cinesco size image.

Subsequently, the operation of the detecting range forming circuit 13 will be described with reference to a flowchart of FIG. 6. When a result of the accumulating circuit 2a is stored into the accumulation histogram memory 2b every field of the input video signal, the detecting range forming circuit 13 detects an accumulation value Acm(b) of frequency data in a range of a luminance level from a zero level to a black belt display level (non-image display color level) (step S1). That is, an accumulation frequency obtained by accumulating the number of times of appearance in which the luminance level of the video signal lies within a range from 0 to 255 is calculated by the histogram accumulating circuit 2a every field and stored into the accumulation histogram memory 2b. An accumulation frequency of the black belt display level in the range accumulation frequency of the luminance levels 0 to 255, therefore, is obtained as an accumulation value Acm(b).

The detecting range forming circuit 13 discriminates whether the accumulation value Acm(b) is larger than a threshold value Thrd or not (step S2). If Acm(b)>Thrd, the detecting range is decreased by an amount corresponding to upper x (x is an integer of 1 or more) lines and lower x lines (step S3). In step S3, a calculation to increase the number of vertical delay lines Vdlyline by x and decrease the number of vertical detecting range lines Vdetline by 2x is executed. After the execution of step S3, the detecting range forming circuit 13 discriminates whether the number of vertical detecting range lines Vdetline as a result of the calculation is smaller than the number of base lines Cinline of the cinesco size image or not (step S4). When Vdetline<Cinline, since the detecting range is narrower than the cinesco size image, the number of vertical delay lines Vdlyline is equalized to the number of base delay lines Cindly of the cinesco size image and the number of vertical detecting range lines Vdetline is equalized to the number of base lines Cinline (step S5). When Vdetline=Cinline, the number of vertical delay lines Vdlyline and the number of vertical detecting range lines Vdetline which were calculated in step S3 are maintained as they are as numerical values of a new detecting range.

If Acm(b)=Thrd in step S2, the detecting range is increased by an amount corresponding to upper y (y is an integer of 1 or more) lines and lower y lines (step S6). In step S6, a calculation to decrease the number of vertical delay lines Vdlyline by y and increase the number of vertical detecting range lines Vdetline by 2y is executed. After the execution of step S6, the detecting range forming circuit 13 discriminates whether the number of vertical detecting range lines Vdetline as a calculation result is larger than the number of base lines Visline of the vista size image or not (step S7). If Vdetline>Visline, since the detecting range is wider than the vista size, the number of vertical delay lines Vdlyline is equalized to the number of base delay lines Visdly of the vista size image and the number of vertical detecting range lines Vdetline is equalized to the number of base lines Visline (step S8). If Vdetline=Visline, the number of vertical delay lines Vdlyline and the number of vertical detecting range lines Vdetline which were calculated in step S6 are maintained as they are as numerical values of a new detecting range.

The detecting range forming circuit 13 supplies the number of vertical delay lines Vdlyline and the number of vertical detecting range lines Vdetline which were set as mentioned above as detecting range data to the masking circuit 14 (step S9).

The masking circuit 14 generates the digital video signal supplied from the A/D converter 11 to the histogram memory 1 for a horizontal scan period corresponding to the number of vertical detecting range lines Vdetline after the elapse of a horizontal scan period corresponding to the number of vertical delay lines Vdlyline set in the detecting range forming circuit 13 in response to a vertical sync signal.

Figure 7:
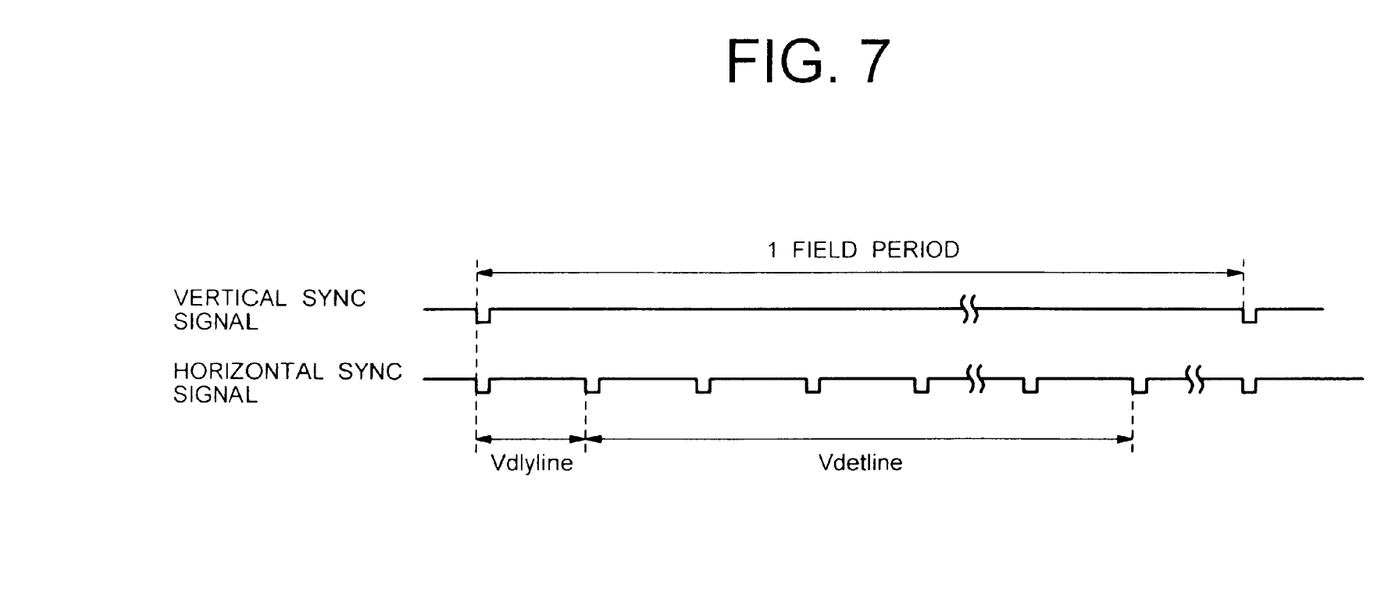
FIG. 7 is a diagram showing the number of vertical delay lines Vdlyline and the number of vertical detecting range lines Vdetline.

FIG. 7 shows the period of time corresponding to each of the number of vertical delay lines Vdlyline and the number of vertical detecting range lines Vdetline in one field of the input video signal. In FIG. 7, the video signal is not supplied from the masking circuit 14 to the histogram memory 1 for the period of time corresponding to the number of vertical delay lines Vdlyline but the video signal is supplied from the masking circuit 14 to the histogram memory 1 for the period of time corresponding to the number of vertical detecting range lines Vdetline.

Figure 8A:
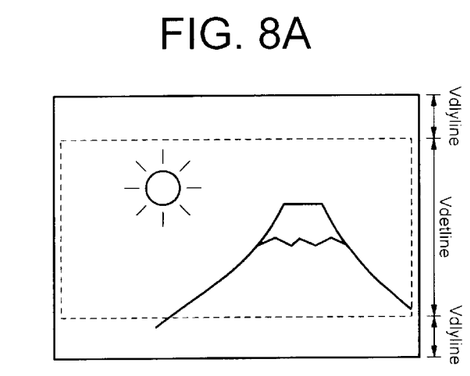
FIGS. 8A to 8D are diagrams showing changes of the number of vertical delay lines Vdlyline and the number of vertical detecting range lines Vdetline in the case where the image is changed from a 4:3 image to the image of a cinesco size by the apparatus of FIG. 5.
Figure 9A:
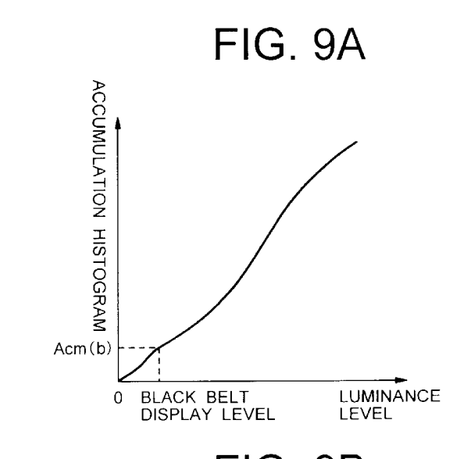
FIGS. 9A to 9D are diagrams showing accumulation histograms in the case of detecting ranges in FIGS. 8A to 8D.

In the case where the input video signal is a signal of the 4:3 image, a detecting range for this image is set to the vista size (portion surrounded by a dotted line) as shown in FIG. 8A, and an accumulation histogram for each luminance level of the video signal of the 4:3 image shows characteristics as shown in FIG. 9A. The accumulation value Acm(b) of the accumulation histogram in FIG. 9A is equal to or smaller than the threshold value Thrd.

Figure 8B:
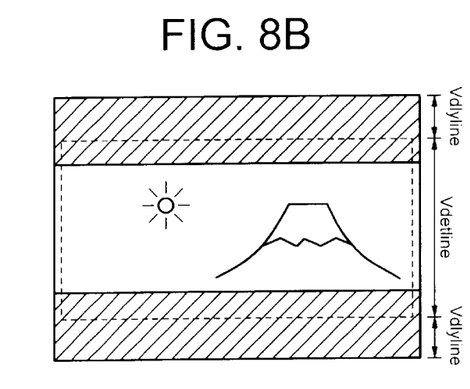
Figure 8C:
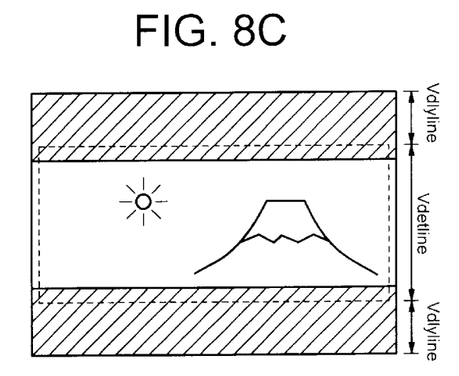
Figure 9B:
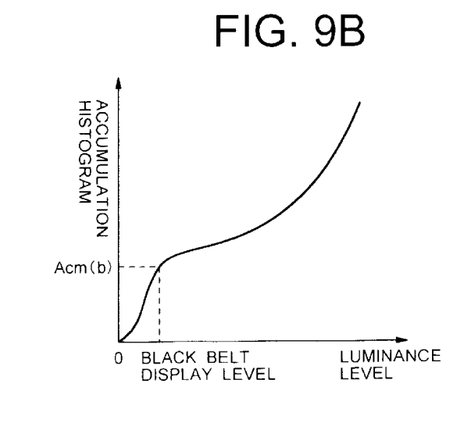
Figure 9C:
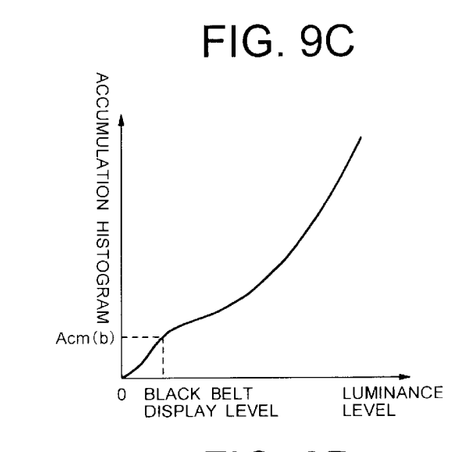

It is assumed that the image corresponding to the input video signal is changed from the 4:3 image to the cinesco size image as shown in FIG. 8B. Hatched portions in FIG. 8B are black belt portions associated by the cinesco size image. An accumulation histogram in the field at this time shows characteristics as shown in FIG. 9B. The accumulation value Acm(b) of the frequency data at the luminance level in a range from the zero level to the black belt display level increases. Since the accumulation value Acm(b) is larger than the threshold value Thrd, the detecting range is narrowed by an amount corresponding to upper x lines (for example, 2 lines) and lower x lines as shown by a dotted line in FIG. 8C. The accumulation value Acm(b), thus, decreases as shown in FIG. 9C.

Figure 8D:
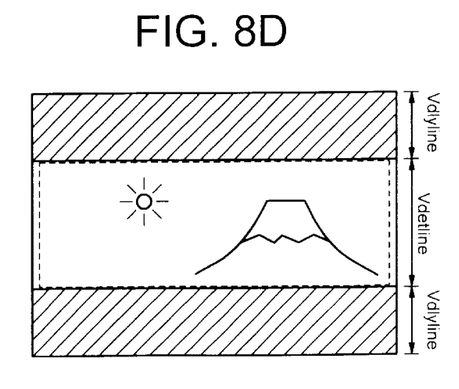
Figure 9D:
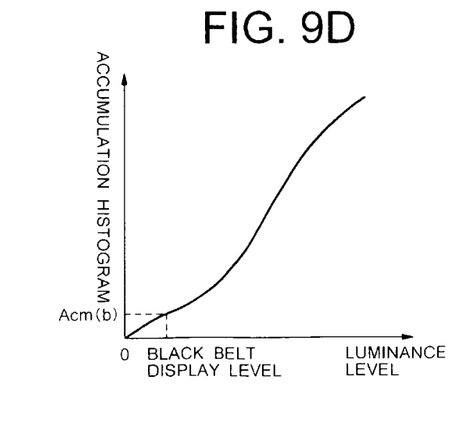

In each of the subsequent fields, since the operation such that the detecting range is set to be narrowed by the amount corresponding to upper x lines of the image and lower x lines is repeated so long as Acm(b)>Thrd, the detecting range for the image is gradually narrowed and the accumulation value Acm(b) of the accumulation histogram gradually decreases. By the execution of steps S4 and S5, thus, the detecting range becomes the cinesco size as shown in FIG. 8D, and the accumulation histogram for each luminance level of the video signal of the cinesco size image shows characteristics as shown in FIG. 9D.

In the luminance gradation correcting apparatus according to the invention, since the luminance data of the actual image portion in the image of one field is supplied to the histogram memory 1, a frequency of the luminance of the black belt display level is not included in the data table showing the frequency data at each luminance level which is formed in the histogram memory 1. The data table of the accumulation histogram, therefore, is formed in the accumulation histogram memory 2b without accumulating the luminance frequencies of the black belt display level. Since the lookup table memory 3 stores the data obtained by normalizing the data stored in the accumulation histogram memory 2b, the influence of the luminance in the black belt portions can be eliminated in the gradation correction of the luminance data. That is, even in the image of the cinesco size or the like having the black belts in the upper and lower portions of the display image, the gradation correction can be performed without causing the black floating in the actual image portion. For the video signals in which the sizes of the actual image portions such as cinesco size, vista size, and the like are different, a complicated circuit for detecting the sizes is unnecessary. Since the size in the vertical direction of the detecting range is gradually increased or decreased every field, a sudden change is not caused in a picture quality.

Although a construction such that a predetermined detecting range is increased or decreased by the same number of lines on the upper and lower sides has been shown in the embodiment (flowchart of FIG. 6), the number of lines which are increased or decreased on the upper side and that on the lower side can be made different.

Figure 10:
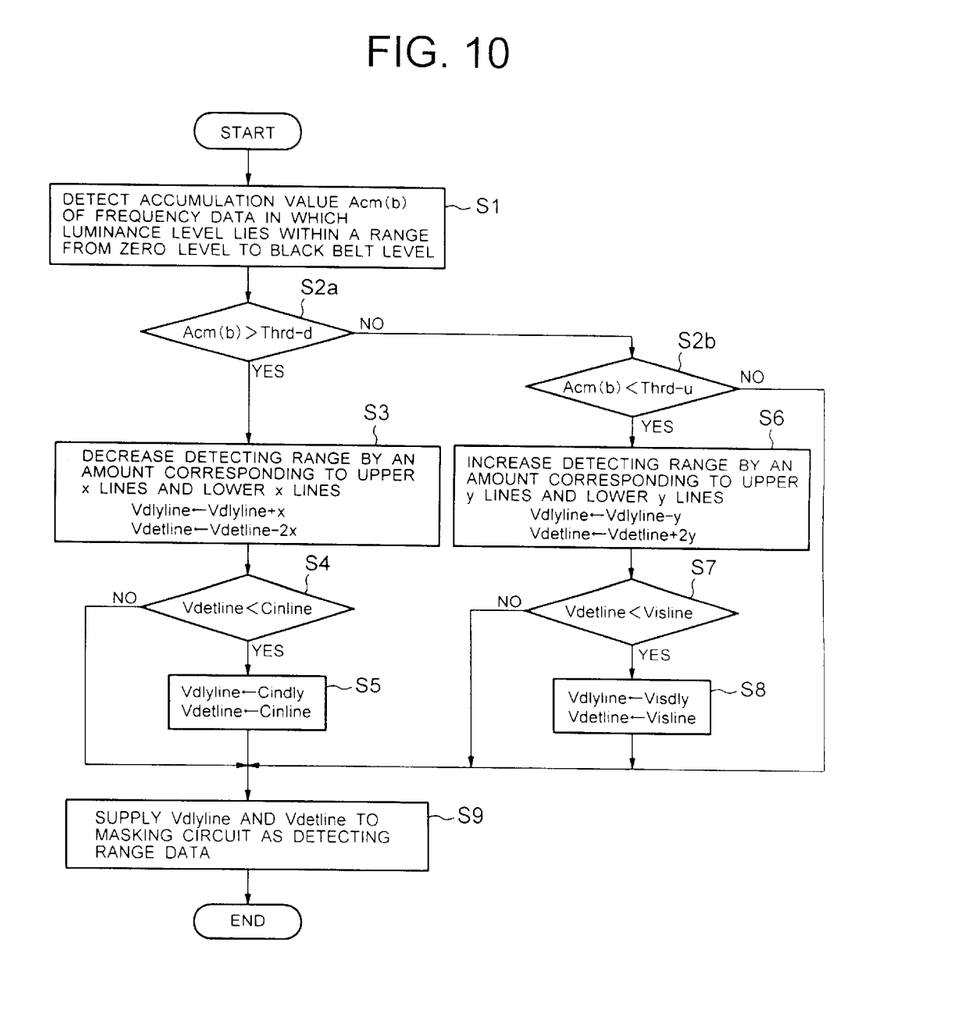
FIG. 10 is a flowchart showing the other operation of the detecting range forming circuit.

Although the accumulation value Acm(b) is compared with the single threshold value Thrd to thereby discriminate the increase or decrease of the detecting range in the embodiment, two threshold values Thrd-d and Thrd-u can be also used. There is a relation of Thrd-d>Thrd-u and a difference between the threshold value Thrd-d and the threshold value Thrd-u is set to be larger than a change amount of the accumulation value Acm(b) due to the numbers of lines (2y, 2x) to be increased or decreased at every field. For example, if x=y=2, Thrd-d=Thrd-u+5. When the two threshold values Thrd-d and Thrd-u are used, as shown in FIG. 10, after the execution of step S1, whether the accumulation value Acm(b) is larger than the threshold value Thrd-d or not is first discriminated (step S2a). If Acm(b)>Thrd-d, step S3 follows. If Acm(b)≦Thrd-d, whether the accumulation value Acm(b) is smaller than the threshold value Thrd-u or not is discriminated (step S2b). If Acm(b)<Thrd-u, step S6 follows. If Thrd-d ≧Acm(b) ≧Thrd-u, the detecting range data (the number of vertical delay lines Vdlyline and the number of vertical detecting range lines Vdetline) set in the previous field is supplied to the masking circuit 14 (step S9). By the above operation, if the number of vertical detecting range lines Vdetline is decreased because a discrimination result in step S2a indicates that Acm(b)>Thrd in one field, the discrimination result in step S2b indicates Acm(b)<Thrd in the next field, so that the repetition of the increase and decrease of Vdetline of every field such that the number of vertical detecting range lines Vdetline is increased is eliminated. The more stable luminance gradation correction can be performed.

Further, although the numbers of lines (2y, 2x) to be increased or decreased every field are set to the predetermined values in the above embodiment, the increase and decrease numbers of lines (2y, 2x) can be also changed in accordance with the difference between the present number of vertical detecting range lines Vdetline and the number of base lines Cinline of the cinesco size image or the number of base lines Visline of the vista size image. For example, when the difference between the present number of vertical detecting range lines Vdetline and the number of base lines is equal to or larger than a predetermined value, the increase or decrease numbers of lines (2y, 2x) can be increased. When it is smaller than the predetermined value, the increase or decrease numbers of lines (2y, 2x) can be decreased.

Figure 11:
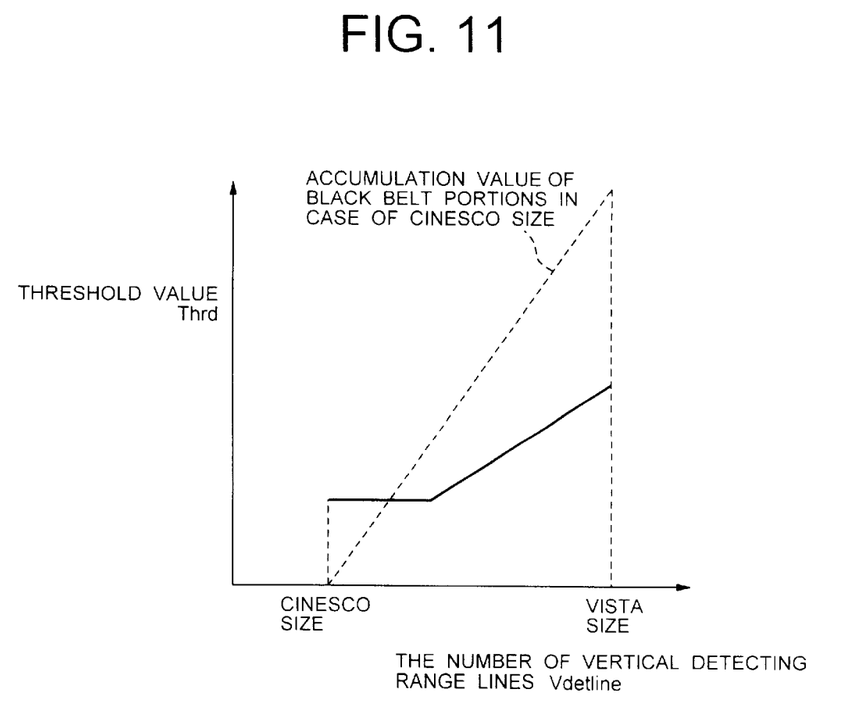
FIG. 11 is a diagram showing threshold value Thrd setting characteristics corresponding to the number of vertical detecting range lines Vdetline.

Although the threshold value Thrd has been set to the predetermined value in the embodiment, the threshold value Thrd can be also changed in accordance with the present number of vertical detecting range lines Vdetline. For example, the threshold value Thrd can be also set like characteristics shown in FIG. 11. That is, if the detecting range (the number of vertical detecting range lines) is located near the cinesco size, the threshold value is set to the predetermined threshold value Thrd so as not to oscillate the detecting range and, after that, as the number of vertical detecting range lines increases, the threshold value Thrd is increased at an inclination smaller than an inclination of the accumulation value of the black belt portions of the cinesco size image. In the vista size image, consequently, when the detecting range is set to the range corresponding to the number of lines of the vista size image, if the signal at the black belt display level or lower exists in the image, a margin up to the number of lines is started to be reduced is improved.

Figure 12:
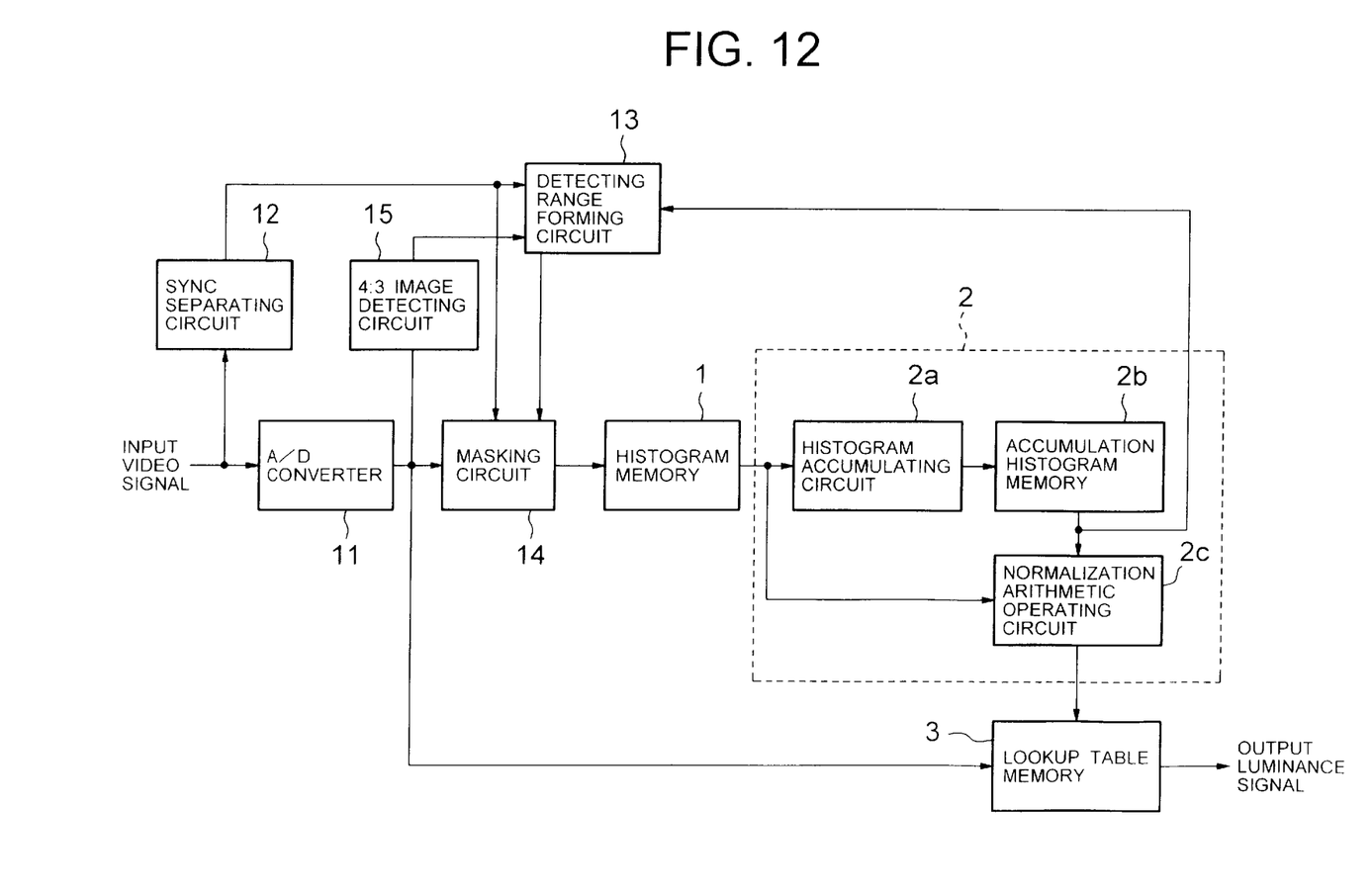
FIG. 12 is a block diagram showing another embodiment of the invention.

FIG. 12 shows another embodiment of the invention. In this embodiment, the detecting range can be adjusted to three kinds of sizes of the 4:3 image, vista size, and cinesco size.

A construction of a luminance gradation correcting apparatus shown in FIG. 12 differs from the apparatus of FIG. 5 with respect to a point that the apparatus has a 4:3 image detecting circuit 15. The 4:3 image detecting circuit 15 is connected to an output of the A/D converter 11 and detects that the image shown by the output digital video signal of the A/D converter 11 is the 4:3 image. In case of the 4:3 image, unlike the cinesco size image and vista size image, the whole luminance of the lines of a predetermined number (for example, 5) from the upper edge (the 39th scanning line) of the actual image range and the luminance of the lines of a predetermined number to the lower edge (the 237th scanning line) is not equal to or lower than the black belt display level. The 4:3 image detecting circuit 15, therefore, determines that the image is the 4:3 image if the whole luminance of those lines is not equal to or lower than the black belt display level. The 4:3 image detecting circuit determines that the image is an image other than the 4:3 image if the whole luminance of those lines is equal to or lower than the black belt display level. A signal indicative of a detection result of the 4:3 image detecting circuit 15 is supplied to the detecting range forming circuit 13.

Figure 13:
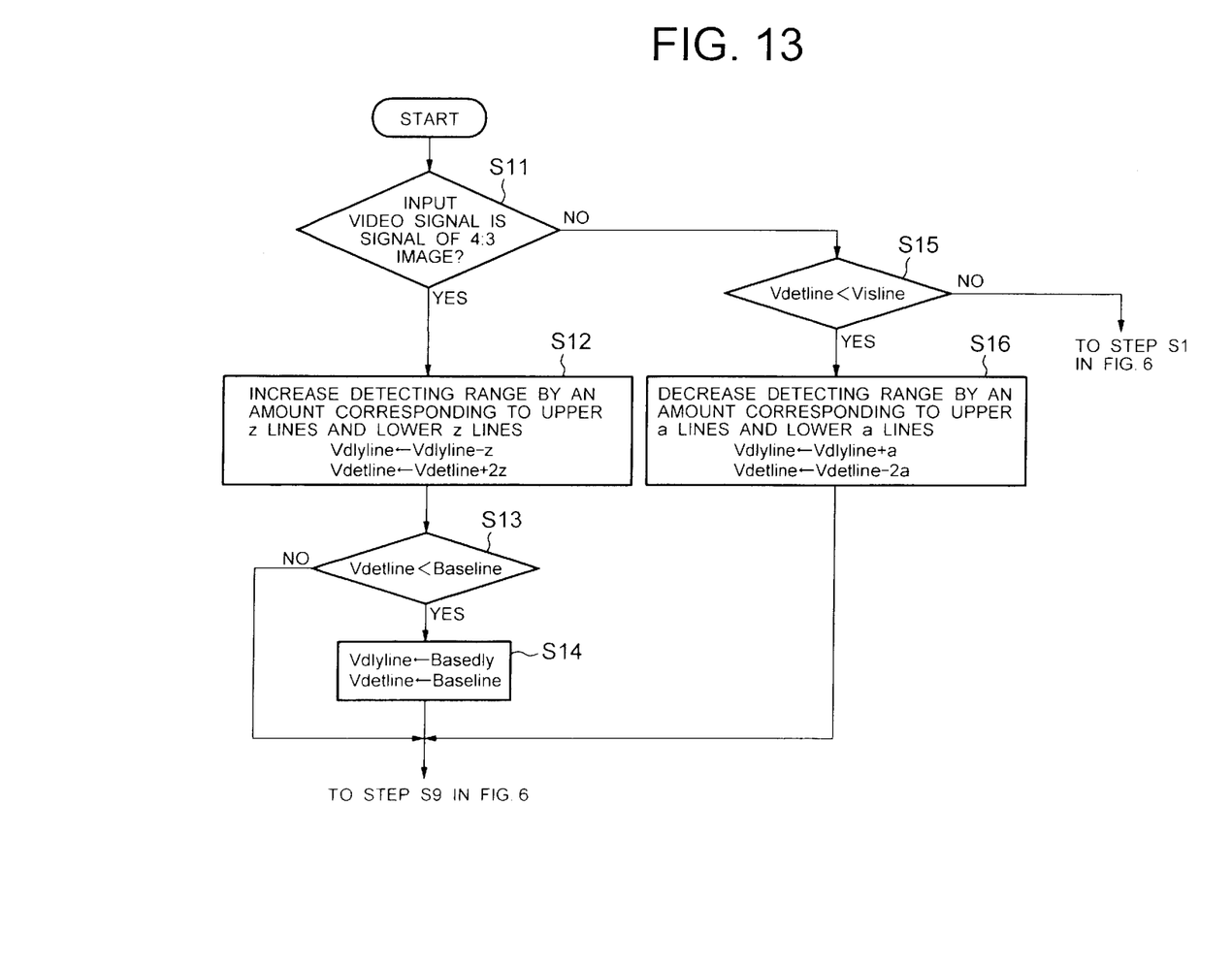
FIG. 13 is a flowchart showing the operation of the detecting range forming circuit in an apparatus of FIG. 12.

The operation of the detecting range forming circuit 13 in case of the apparatus of FIG. 12 will now be described with reference to a flowchart of FIG. 13. When the result of the histogram accumulating circuit 2a is stored into the accumulation histogram memory 2b every field of the input video signal, the detecting range forming circuit 13 discriminates whether the input video signal is the signal of the 4:3 image or not in accordance with an output signal of the 4:3 image detecting circuit 15 (step S11). If the input video signal is the signal of the 4:3 image, the detecting range is increased by an amount corresponding to upper z lines and lower z lines (step S12). In step S12, a calculation so as to decrease the number of vertical delay lines Vdlyline by the amount corresponding to z lines and increase the number of vertical detecting range lines Vdetline by the amount corresponding to 2z lines is executed. After the execution of step S12, the detecting range forming circuit 13 discriminates whether the number of vertical detecting range lines Vdetline as a calculation result is larger than the number of base lines Baseline of the 4:3 image or not (step S13). When Vdetline>Baseline, since the detecting range is wider than the size of the 4:3 image, the number of vertical delay lines Vdlyline is equalized to the number of base delay lines Basedly of the 4:3 image and the number of vertical detecting range lines Vdetline is equalized to the number of base lines Baseline (step S14). If Vdetline<Baseline, the number of vertical delay lines Vdlyline and the number of vertical detecting range lines Vdetline which were calculated in step S12 are maintained as they are as numerical values of a new detecting range.

The detecting range forming circuit 13 supplies the number of vertical delay lines Vdlyline and the number of vertical detecting range lines Vdetline which were set as mentioned above as detecting range data to the masking circuit 14 (step S9).

If it is determined in step S11 that the input video signal is a signal other than the 4:3 image signal, the detecting range forming circuit 13 discriminates whether the present number of vertical detecting range lines Vdetline is larger than the number of base lines Visline of the vista size image or not (step S15). If Vdetline>Visline, the detecting range is decreased by an amount corresponding to upper a (a is an integer of 1 or more) lines and lower a lines (step S16). In step S16, a calculation so as to increase the number of vertical delay lines Vdlyline by the amount corresponding to a lines and decrease the number of vertical detecting range lines Vdetline by the amount corresponding to 2a lines is executed. After the execution of step S16, the detecting range forming circuit 13 advances to step S9.

Figure 6:
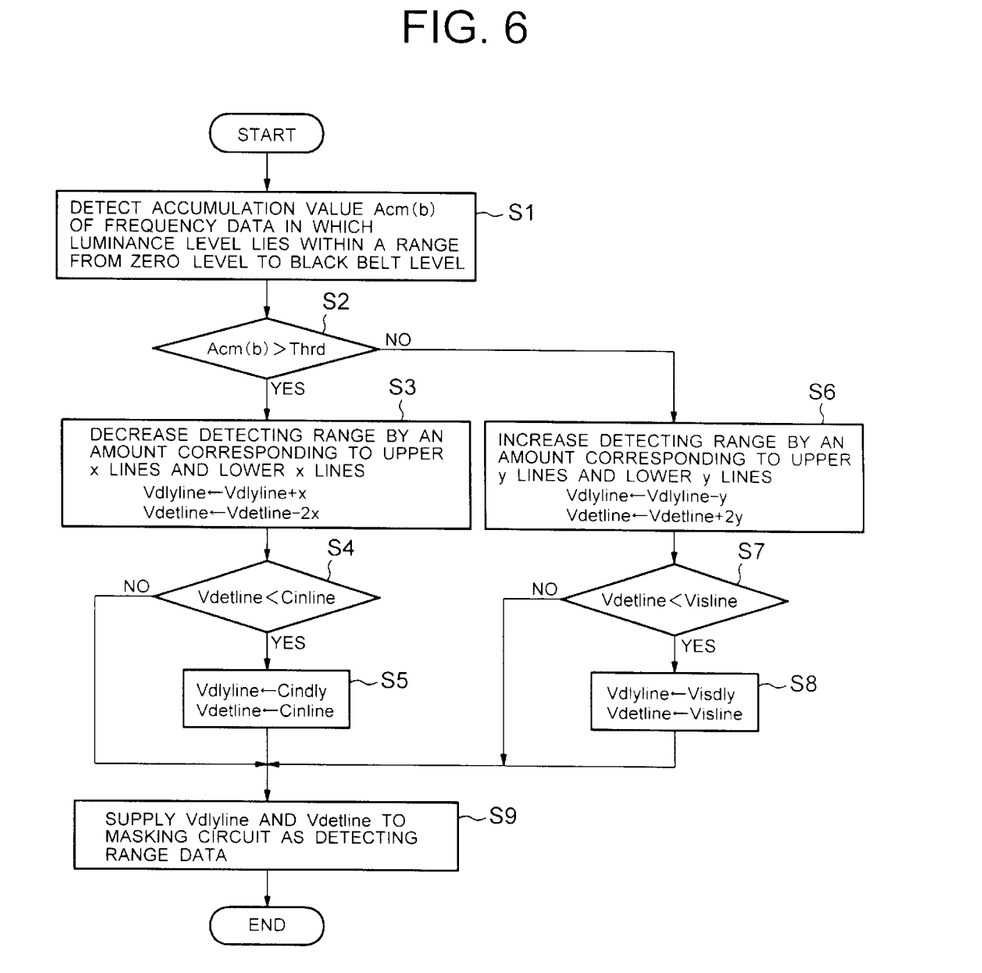
FIG. 6 is a flowchart showing the operation of a detecting range forming circuit in an apparatus of FIG. 5.

If Vdetline<Visline is determined in step S15, the detecting range forming circuit 13 executes the operations in steps S1 to S9 shown in FIG. 6 and forms detecting range data corresponding to the vista size image or cinesco size image.

Figure 14A:
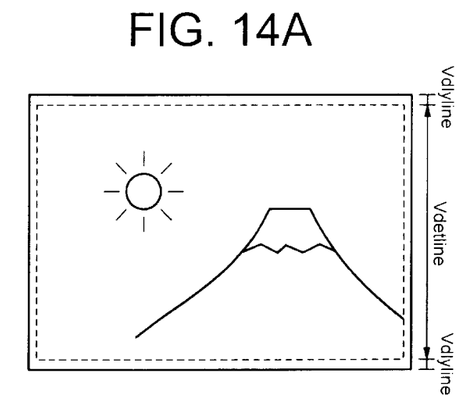
FIGS. 14A to 14D are diagrams showing changes of the number of vertical delay lines Vdlyline and the number of vertical detecting range lines Vdetline in the case where the image is changed from the 4:3 image to the image of a vista size by the apparatus of FIG. 12.

When the input video signal is a signal of the 4:3 image, a detecting range for this image is as shown by a dotted line in FIG. 14A. The number of vertical detecting range lines Vdetline of the 4:3 image is equal to the number of base lines Baseline.

Figure 14B:
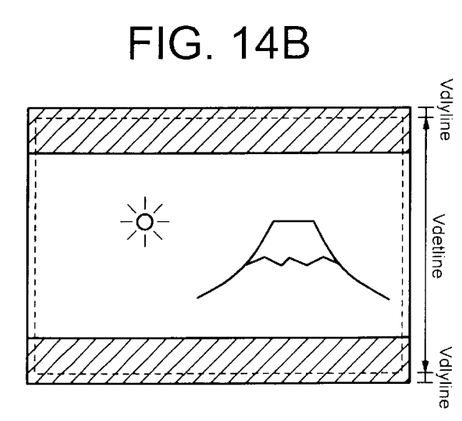
Figure 14C:
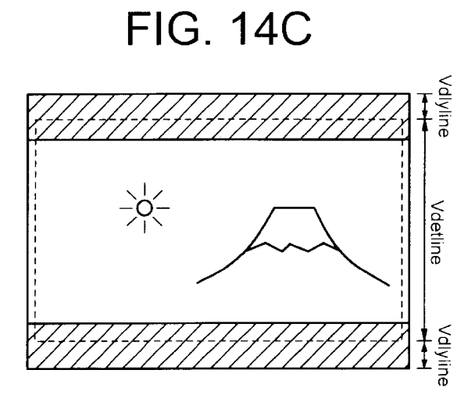
Figure 14D:
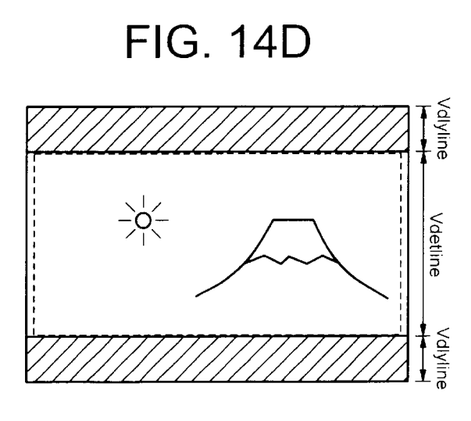

It is now assumed that the image of the input video signal is changed from the 4:3 image to a vista size image as shown in FIG. 14B. The whole luminance of the lines of a predetermined number from the 39th scanning line in the field at this time and the luminance of the lines of a predetermined number up to the 237th scanning line is equal to or lower than the black belt display level. The operations in steps S15 and S16 are repeated and the detecting range of the image, that is, the number of vertical detecting range lines Vdetline is gradually decreased as shown in FIG. 14C. If Vdetline<Visline is determined in step S15, the detecting range finally becomes a range of the vista size shown by a dotted line as shown in FIG. 14D and the number of vertical detecting range lines Vdetline is equal to the number of base lines Visline through the operations in steps S1 to S8.

Although the non-image display color level as a luminance level of the non-image portion of the image has been disclosed as a black belt display level in the embodiments, since the non-image portion is not limited to black, naturally, the non-image display color level can be also set to a luminance level of another display color.

As mentioned above, according to the invention, the predetermined detecting range in the vertical direction in the image shown by the input luminance signal is set in accordance with the size of actual image portion of the image. By this configuration, the gradation correction of the luminance level of the input luminance signal can be properly performed without being influenced by the luminance level of the non-image portions of the luminance signal.

What is claimed is:

1. A luminance gradation correcting apparatus comprising:
    a masking part for allowing only a luminance signal of a pixel in a predetermined detecting range in the vertical direction in an image shown by an input luminance signal to pass;
    a histogram memory for forming frequency data at each luminance level of the luminance signal outputted from said masking part at every predetermined period and storing said data;
    a correcting part for correcting the luminance level of said input luminance signal based on the frequency data in said histogram memory; and
    a detecting range setting part for obtaining an accumulation value of said frequency data with respect to a luminance signal in a portion of the luminance level in a range from a zero level to a non-image display color level in said input luminance signal and setting said predetermined detecting range based on said accumulation value.

2. An apparatus according to claim 1, wherein said detecting range setting part compares said accumulation value with a predetermined threshold value, changes said predetermined detecting range to a range which was decreased by an amount corresponding to a first predetermined number of lines on the upper side and a second predetermined number of lines on the lower side when said accumulation value is larger than said predetermined threshold value, and changes said predetermined detecting range to a range which was increased by an amount corresponding to a third predetermined number of lines on the upper side and a fourth predetermined number of lines on the lower side when said accumulation value is smaller than said predetermined threshold value.

3. An apparatus according to claim 2, wherein first and second threshold values are provided as said predetermined threshold value, and a difference between said first and second threshold values is set to be larger than a change amount of said accumulation value due to a change amount of said predetermined detecting range per field period of time.

4. An apparatus according to claim 2, wherein said predetermined threshold value is changed in accordance with an actual image size of the image shown by said input luminance signal.

5. An apparatus according to claim 2, wherein said predetermined threshold value is increased as an actual image size of the image shown by said input luminance signal increases.

6. An apparatus according to claim 1, wherein
    said histogram memory forms said frequency data at every field period and stores it.

7. An apparatus according to claim 1, wherein a change amount of said predetermined detecting range per field period of time is set in accordance with an actual image size of the image shown by said input luminance signal.

8. An apparatus according to claim 7, wherein when a difference between said predetermined detecting range and an actual image size of the image shown by said input luminance signal is larger than a predetermined value, the change amount of said predetermined detecting range per field period is increased, and the difference between said predetermined detecting range and the actual image size of the image shown by said input luminance signal is smaller than said predetermined value, the change amount of said predetermined detecting range per field period is decreased.

9. An apparatus according to claim 1, wherein said detecting range setting part discriminates whether the image shown by said input luminance signal is a 4:3 image or not, sets said predetermined detecting range to a range corresponding to the 4:3 image when the image is the 4:3 image, discriminates whether said present predetermined detecting range is larger than an actual image range of a vista size image or not when the image is not the 4:3 image, decreases said predetermined detecting range at every said predetermined period when said present predetermined detecting range is larger than the actual image range of the vista size image, and sets said predetermined detecting range based on said accumulation value when said present predetermined detecting range is equal to or smaller than the actual image range of the vista size image.

* * * * *